US012747945B2

(12) United States Patent
Amendola et al.

(10) Patent No.: US 12,747,945 B2
(45) Date of Patent: Sep. 29, 2026

(54) GEODETIC SURVEYING SYSTEM AND METHOD OF OPERATION

(71) Applicants: David G. Amendola, Westbrook, CT (US); Karen S. Amendola, Westbrook, CT (US)

(72) Inventors: David G. Amendola, Westbrook, CT (US); Karen S. Amendola, Westbrook, CT (US)

( * ) Notice: Subject to any disclaimer, the term of this patent is extended or adjusted under 35 U.S.C. 154(b) by 341 days.

(21) Appl. No.: 18/500,964

(22) Filed: Nov. 2, 2023

(65) Prior Publication Data

US 2024/0191992 A1 Jun. 13, 2024

Related U.S. Application Data

(60) Provisional application No. 63/381,956, filed on Nov. 2, 2022.

(51) Int. Cl.
*G01C 15/06* (2006.01)
*G01C 9/02* (2006.01)

(52) U.S. Cl.
CPC ............... *G01C 15/06* (2013.01); *G01C 9/02* (2013.01)

(58) Field of Classification Search
CPC ............................ G01C 15/006; G01C 15/008
USPC .................................. 33/293, 294, 295, 296
See application file for complete search history.

(56) References Cited

U.S. PATENT DOCUMENTS 3,528,747 A * 9/1970 Walsh .................... G01B 11/26 356/154
4,676,634 A * 6/1987 Petersen .............. G01C 15/006 356/141.3
4,899,452 A * 2/1990 Schafer .................. G01C 15/06 33/809
4,993,160 A * 2/1991 Fraley .................... G01C 15/02 33/286
5,566,460 A * 10/1996 Bates ..................... G01C 15/06 33/296
6,443,000 B1 * 9/2002 Pugh ...................... G01K 13/02 374/54
6,772,526 B1 * 8/2004 Crain ..................... G01C 15/00 33/295
7,788,815 B2 * 9/2010 Yandrick ................ G01C 15/06 33/294
7,804,051 B2 * 9/2010 Hingerling ............. G01C 15/06 250/206.1
8,567,076 B2 * 10/2013 Ortleb ................... G01C 15/06 33/228
8,572,856 B1 * 11/2013 Vannoy .................. G01C 15/06 33/296
8,769,838 B2 * 7/2014 Ward ..................... G01C 15/06 33/293
9,267,795 B2 * 2/2016 Frank ....................... G01C 9/02
(Continued)

FOREIGN PATENT DOCUMENTS

KR 101658028 B1 * 9/2016 ........... G01C 13/008
KR 102346346 B1 * 1/2022 ............. G01C 15/06

*Primary Examiner* — George B Bennett

(57) ABSTRACT

A geodetic surveying system may include a pole-mountable base plate comprising an aperture. A geodetic surveying system may include a pole. A geodetic surveying system may include a mountable satellite positioning system receiver. A geodetic surveying system may include a computing device in communication with the mountable satellite positioning system receiver. A geodetic surveying system may include a display shield.

14 Claims, 6 Drawing Sheets

(56) References Cited

U.S. PATENT DOCUMENTS

| | | | | |
|---|---|---|---|---|
| 9,341,473 | B2 * | 5/2016 | Zogg | G01C 15/002 |
| 9,377,301 | B2 * | 6/2016 | Neier | G01S 17/87 |
| 9,541,392 | B2 * | 1/2017 | Dusha | G01C 15/06 |
| 10,119,818 | B2 * | 11/2018 | Maar | G01B 11/0608 |
| 10,234,287 | B2 * | 3/2019 | Siercks | H04N 23/55 |
| 10,563,980 | B2 * | 2/2020 | Edelman | G01S 19/49 |
| 10,704,902 | B2 * | 7/2020 | Parés | G01C 15/06 |
| 10,969,494 | B2 * | 4/2021 | Kipka | G01C 15/06 |
| 11,536,568 | B2 * | 12/2022 | Nishita | G01C 15/06 |
| 11,674,801 | B2 * | 6/2023 | Morris | G01C 15/06 702/159 |
| 11,808,914 | B2 * | 11/2023 | Qiu | G01V 8/10 |
| 12,025,467 | B2 * | 7/2024 | Müller | G06T 7/70 |
| 12,085,378 | B2 * | 9/2024 | Müller | G01B 11/002 |
| 12,123,717 | B2 * | 10/2024 | Johnston | G06T 7/73 |
| 2009/0024325 | A1 * | 1/2009 | Scherzinger | G01C 15/06 701/469 |
| 2013/0162469 | A1 * | 6/2013 | Zogg | G01S 19/14 342/357.52 |
| 2016/0138915 | A1 * | 5/2016 | Green | G01C 3/08 356/4.01 |
| 2017/0176185 | A1 * | 6/2017 | Maar | G01C 15/06 |
| 2018/0180416 | A1 * | 6/2018 | Edelman | G01C 15/002 |
| 2022/0011105 | A1 * | 1/2022 | Hotz | G01C 1/02 |
| 2024/0302167 | A1 * | 9/2024 | Graesser | G01C 15/006 |
| 2025/0123100 | A1 * | 4/2025 | Johnston | G01C 1/02 |

* cited by examiner

GEODETIC SURVEYING SYSTEM AND METHOD OF OPERATION

CROSS-REFERENCE TO RELATED APPLICATIONS

This application claims priority to U.S. Provisional Patent Application No. 63/381,956, filed on Nov. 2, 2022 entitled "GEODETIC SURVEYING SYSTEM AND METHOD OF OPERATION", which is expressly incorporated by reference herein. In the event of any inconsistency between the priority application recited above and this application, this application shall prevail.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

TECHNICAL FIELD

The present disclosure relates, in general, to position measurement and surveying, and more particularly, to novel tools and techniques for marking and referencing positions at a site.

BACKGROUND ART

The art of surveying and mapping has dramatically changed as a result of the availability and incorporation of satellite communication equipment. Satellite survey devices include receivers that receive position signals from the global positioning system (GPS), Global Navigation Satellite System (GLONASS) receiver or other satellite system. The satellite position signals are used to compute the position of a receiver.

Traditional geodetic surveying systems included a GPS receiver mounted to pole, where the GPS receiver and antenna were in communication with a mounted or handheld GPS device. For stability and hands-free use, tripod support structures were often attached to the pole. A surveyor would then hold and move the pole about until level and the GPS device indicated the pole was at the location to be surveyed. Once positioned, the information received by the GPS receiver was transmitted to the GPS device to compute certain location specifics, such as, for example, the altitude of the location, typically in feet above or below sea level.

The steps involved in setting grade stakes using this traditional tripod-supported geodetic survey system typically included some or all of the following:

a. Determine desired grade stake placement location;
b. Maneuver the tripod-supported geodetic survey system to desired stake placement location;
c. Deploy, configure, and secure the tripod support legs;
d. Imprint soil at the desired grade stake location;
e. Remove tripod-supported geodetic survey system from desired grade stake location;
f. Drive grade stake into ground at imprint location;
g. Return tripod-supported geodetic survey system to grade stake location;
h. Level tripod-supported geodetic survey system;
i. Record grade at top of grade stake, using the tripod-supported geodetic survey system to establish elevation;
j. Remove tripod-supported geodetic survey system from top of grade stake and record elevation in field book;
k. Subtract desired elevation from top of grade stake elevation;
l. Manually measure down to desired elevation on grade stake using a measuring apparatus to mark and reference grade stake;
m. Measure a distance x down from the top of the grade stake;
n. Mark the grade stake with an indicator of the value obtained from step j minus the distance down in step l; and
o. Tie a ribbon to the grade stake.

Unfortunately, the tripod-supported geodetic survey system was generally unstable and cumbersome to use, and further involved steps that included one or more of manual measuring, calculating, or recording, sometimes resulting in surveying errors, and therefore sometimes creating the need to repeat the process, increasing time, expense, and frustration.

In addition, the tripod support structures were often expensive and prone to breaking with heavy use, such as is typical on a construction site. The tripod support structure further introduced steps that involved moving the geodetic surveying system away from and back to the stake location in order to allow for the driving of the stake into the ground, effectively not allowing for the marking of the grade stake at the time of surveying.

SUMMARY OF THE INVENTION

Briefly, a geodetic surveying system embodiment including a pole-mountable base plate with an aperture extending from a surveying pole mount point to the perimeter of the base plate is disclosed herein. A surveying pole with measurement markings is mounted to the base plate at a mount point, such as, for example, at the center of the base plate. In some embodiments an unmarked top surveying pole portion is coupled to the measurement marked surveying pole at the upper end of the measurement marked surveying pole portion. A mountable satellite positioning system receiver and antenna, such as, for example, a GPS receiver, is mounted to the upper end of the unmarked top surveying pole portion. In some embodiments, a level indicator is mounted to or embedded in a pole portion. In some embodiments, a computing device in communication with the satellite positioning system receiver displays the GPS output on a display. In some instances, a display shield that is adjustable, removable, or both, is mounted to a pole portion, the display shield being adjustable to, at certain times, be positioned between the sun or other light source such that the display visibility is enhanced, such as in high lighting conditions. In some embodiments, a battery is mounted on a pole portion, such as a lower pole portion.

The geodetic surveying system disclosed herein allows the placing of the base plate next to the grade stake, the surveying activity, and the marking of the grade stake using the measurements marked on the pole to occur with reduced movement and motion, which can increase productivity, reduce errors, and improve the surveyor experience.

The geodetic surveying system with the base plate support structure disclosed herein is easier to set up as it does not include the need to deploy, configure, and secure the tripod legs.

The base plate-supported geodetic survey system can exhibit improved stability and ease of use, and can further reduce the steps involved, such as the removal of manual measuring, calculating, or recording. This can result in reducing surveying errors, and therefore reducing the need to repeat the process, thus decreasing time, expense, and frustration.

The elimination of the tripod support structure can reduce expense, particularly given their tendency to break with heavy use. The introduction of the base plate support structure can remove the steps that involve moving the geodetic surveying system away from and back to the stake location in order to allow for the driving of the stake into the ground, now effectively allowing for the marking of the grade stake at the time of surveying.

In some aspects, the techniques described herein relate to a geodetic surveying system, including: a pole-mountable base plate including an aperture; a pole; a mountable satellite positioning system receiver; a computing device in communication with the mountable satellite positioning system receiver; and a display shield.

In some aspects, the techniques described herein relate to a geodetic surveying system, further including an antenna.

In some aspects, the techniques described herein relate to a geodetic surveying system, further including a battery.

In some aspects, the techniques described herein relate to a geodetic surveying system, wherein the pole includes a surveying pole portion.

In some aspects, the techniques described herein relate to a geodetic surveying system, wherein the surveying pole portion includes measurement markings.

In some aspects, the techniques described herein relate to a geodetic surveying system, wherein the aperture extends from a surveying pole portion mount point to a perimeter of the pole-mountable base plate.

In some aspects, the techniques described herein relate to a geodetic surveying system, wherein the surveying pole portion is coupled to the pole-mountable base plate.

In some aspects, the techniques described herein relate to a geodetic surveying system wherein the mountable satellite positioning system receiver includes a GPS receiver.

In some aspects, the techniques described herein relate to a geodetic surveying system, further including a level indicator.

In some aspects, the techniques described herein relate to a geodetic surveying system, wherein the level indicator includes a pole mounted level indicator.

In some aspects, the techniques described herein relate to a geodetic surveying system, wherein the level indicator includes an embedded level indicator.

In some aspects, the techniques described herein relate to a geodetic surveying system, wherein the computing device includes a display.

In some aspects, the techniques described herein relate to a geodetic surveying system, wherein the display shield includes an adjustable display shield.

In some aspects, the techniques described herein relate to a geodetic surveying system, wherein the display shield includes a removable display shield.

In some aspects, the techniques described herein relate to a geodetic surveying system, wherein the display shield includes a pole mountable display shield.

These and other objects and advantages of the present invention will no doubt become obvious to those of ordinary skill in the art after having read the following detailed description of the preferred embodiment which is illustrated in the drawing figures.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
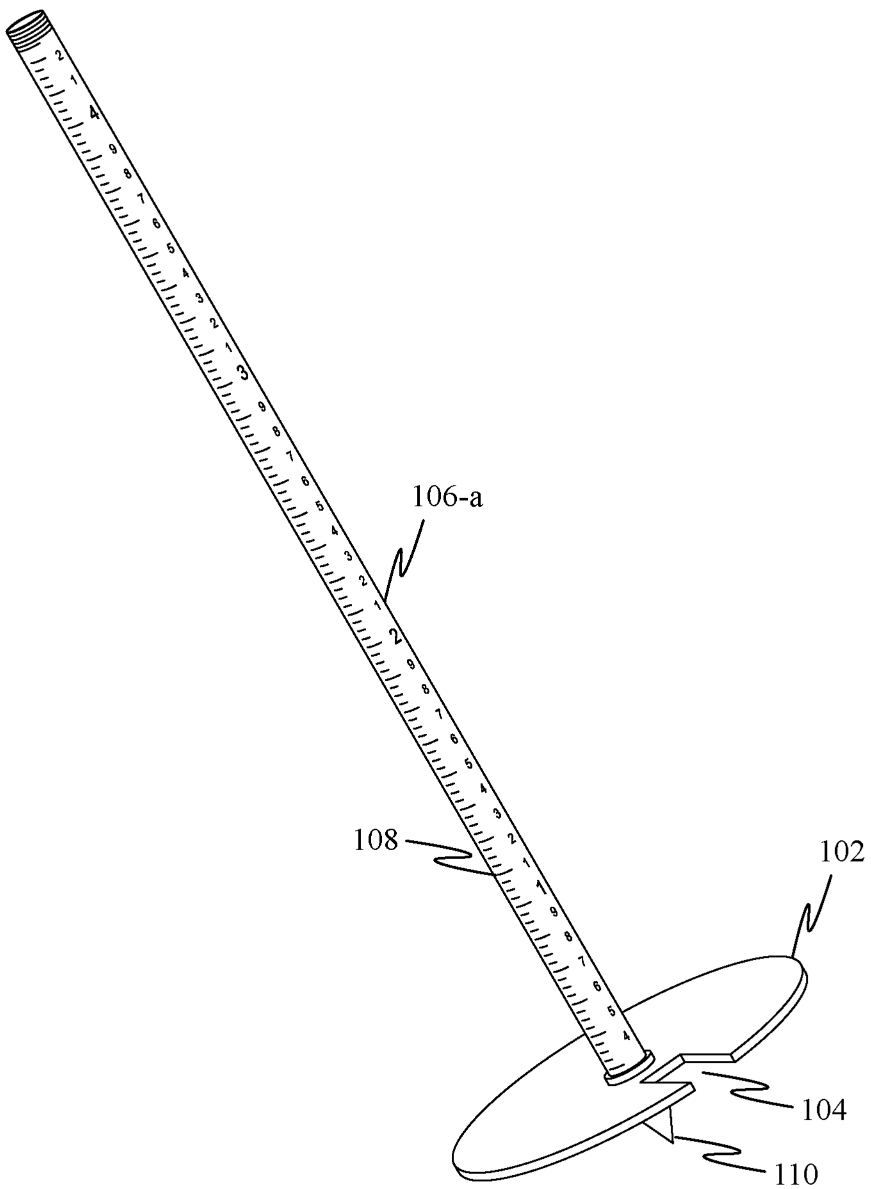
FIG. 1 is a drawing in perspective of a threaded-end pole (106) with measurement markings (108) and circular base plate (102) with aperture (104).
Figure 2:
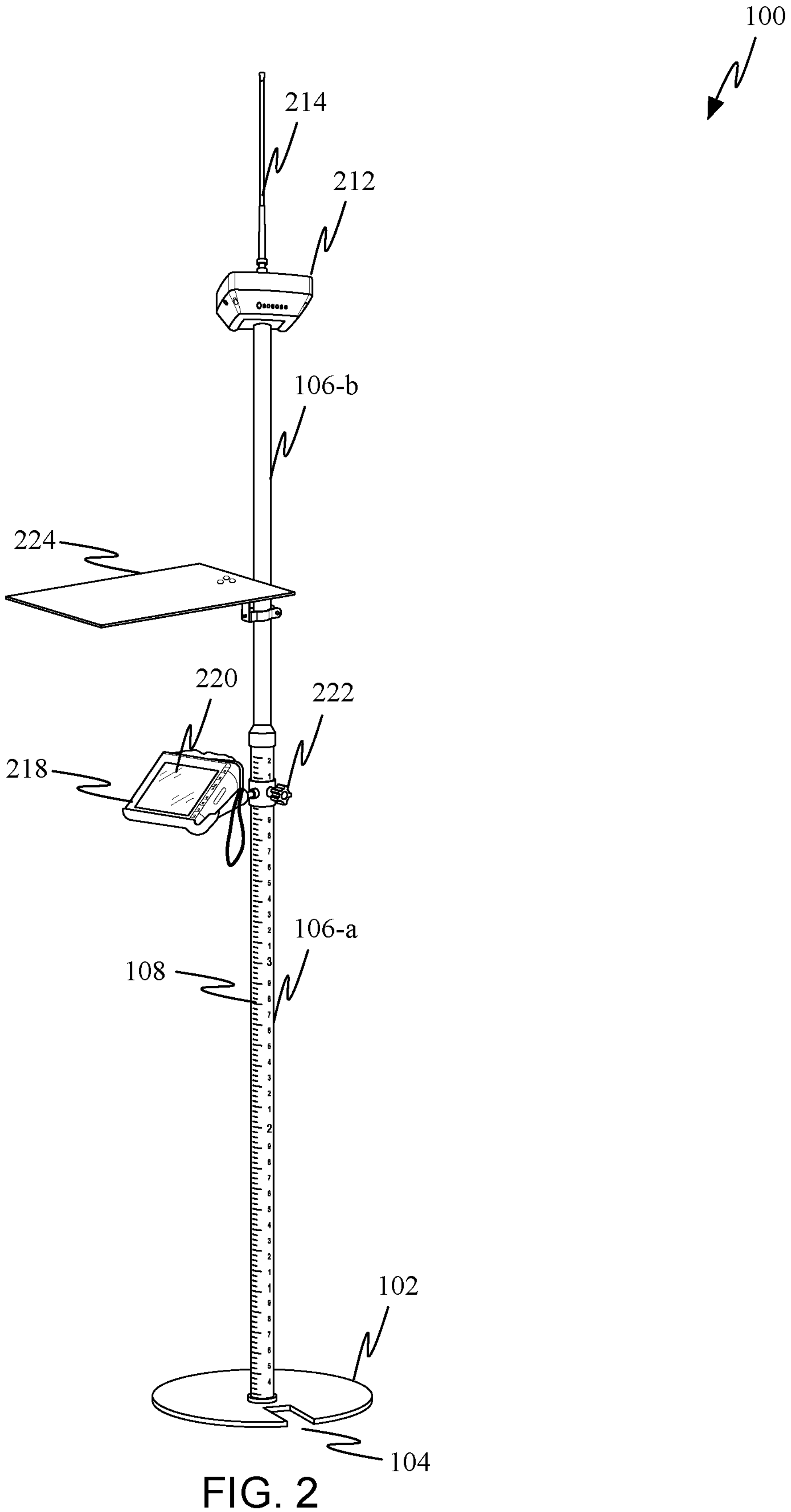
FIG. 2 is a picture of a side view of the geodetic surveying system (100) with base plate (102) and mountable display shield (224).
Figure 3:
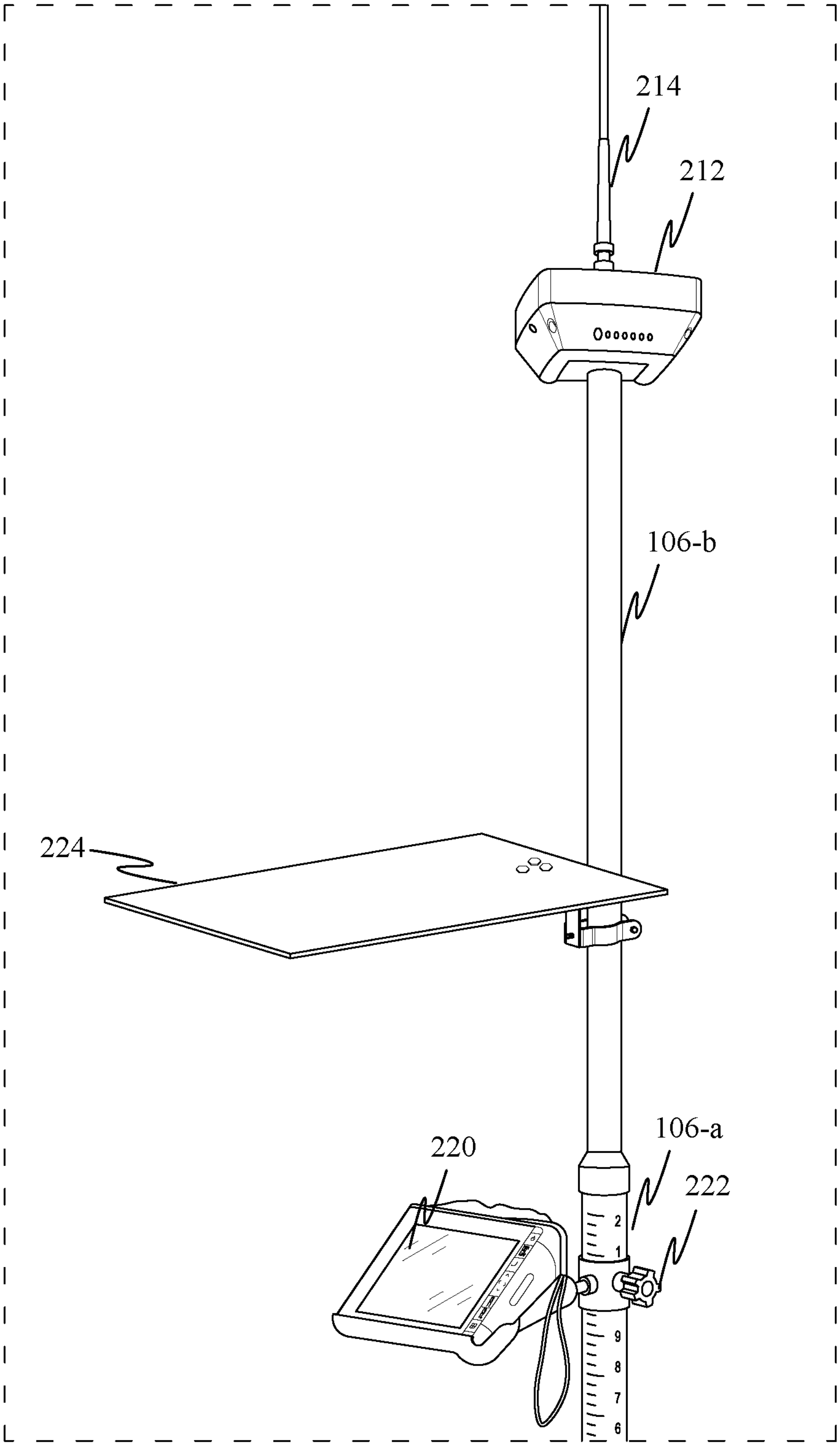
FIG. 3 is a picture of a side view of an upper portion of the geodetic surveying system (100) with base plate (102) and mountable display shield (224) of FIG. 2.
Figure 4:
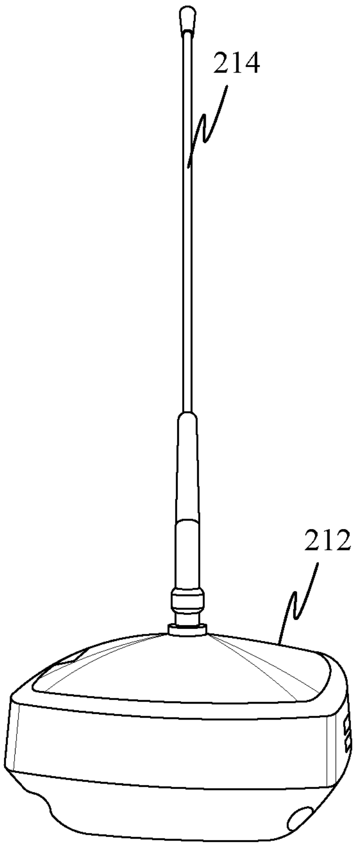
FIG. 4 is a picture of a side view of the GPS receiver (212) mounted on the geodetic surveying system (100) of FIG. 2.
Figure 5:
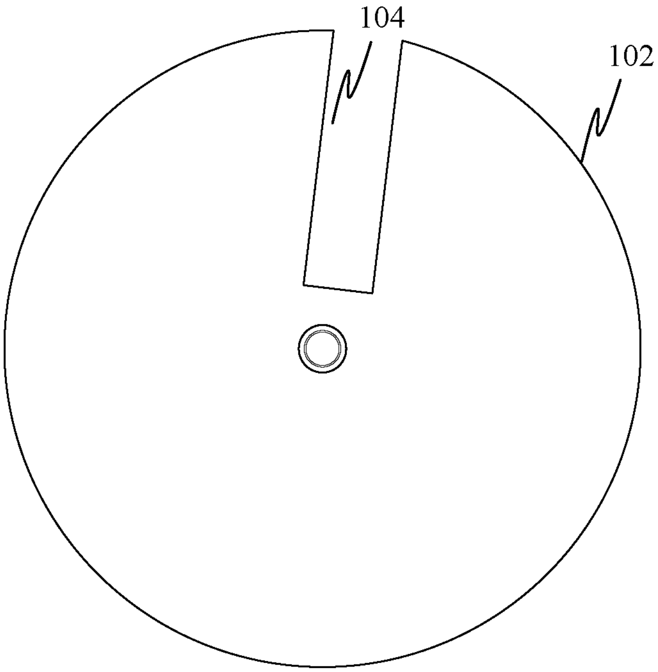
FIG. 5 is a picture of a top view of the base plate (102) of FIG. 2.
Figure 6:
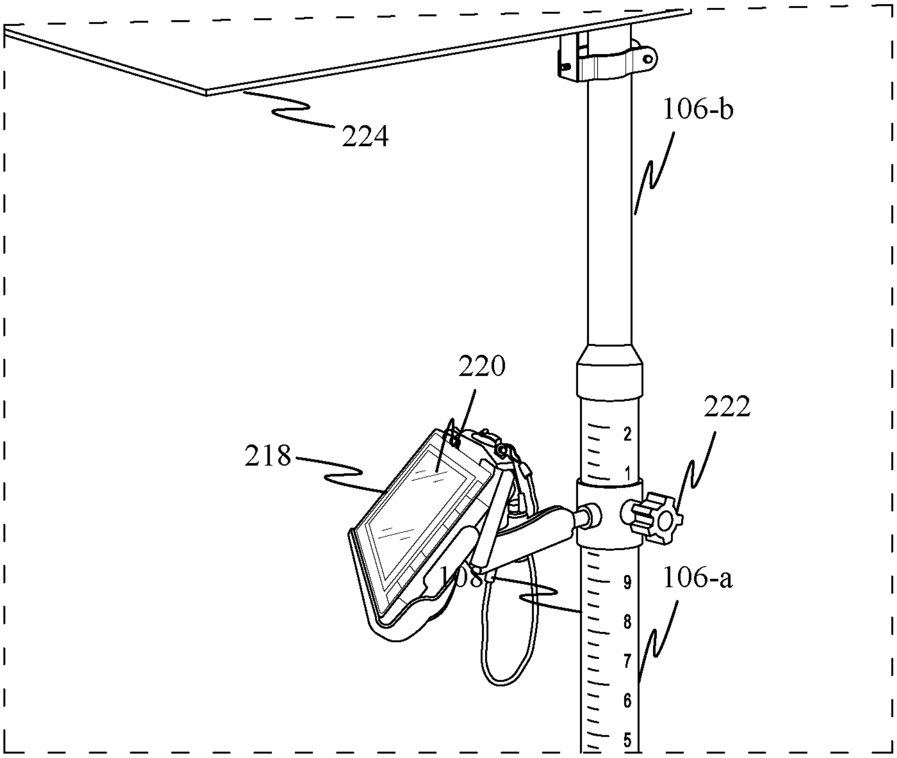
FIG. 6 is a picture of a side view of a middle portion of the geodetic surveying system (100) with base plate (102) and mountable display shield (224).
Figure 7:
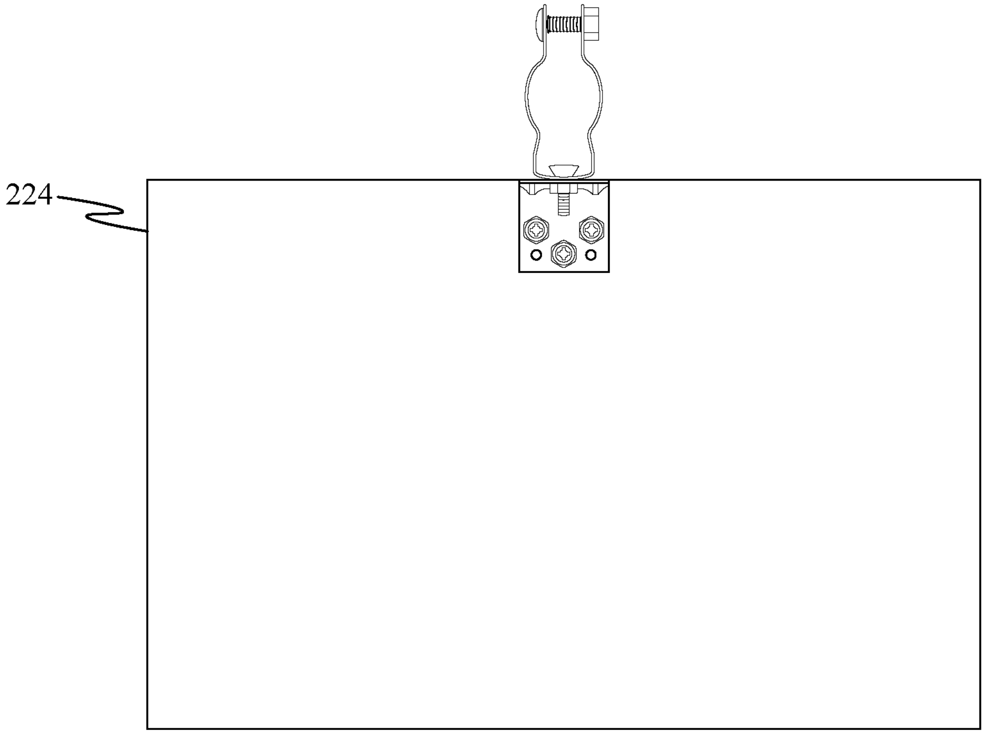
FIG. 7 is a picture of a bottom view of the display shield (224) of FIG. 2.
Figure 8:
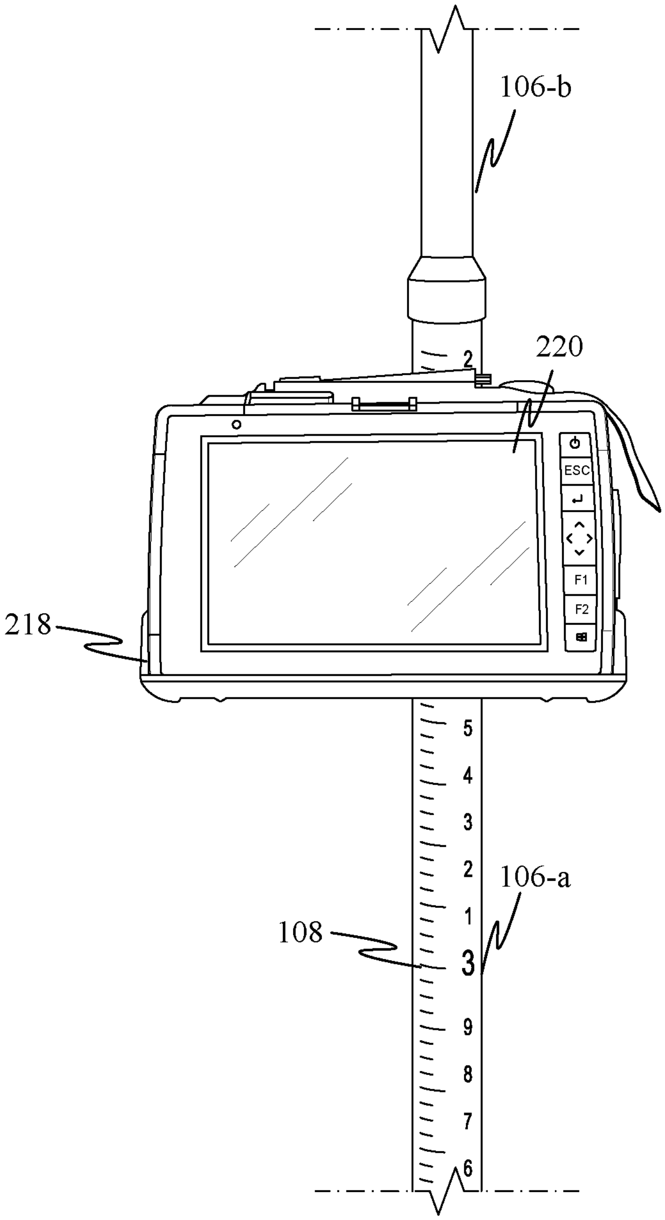
FIG. 8 is a picture of a front view of the GPS device (218) of FIG. 2.

The applicant believes that it has discovered at least one or more of the problems and issues with systems and methods noted above as well as advantages variously provided by differing embodiments of the geodetic surveying system and method of operation disclosed in this specification.

The various features and advantages of the systems, devices, and methods of the technology described herein will become more fully apparent from the following description of the implementations illustrated in the figures. These implementations are intended to illustrate the principles of this disclosure, and this disclosure should not be limited to merely the illustrated examples. The features of the illustrated implementations can be modified, combined, removed, and/or substituted as will be apparent to those of ordinary skill in the art upon consideration of the principles disclosed herein.

In some embodiments, the base plate (102) is made of a rigid heavy material, such as, for example, a metal material, such as iron or steel. While the base plate (102) can be many different shapes, in some instances, the base plate (102) is circular or elliptical, such as a circular plate with a diameter between 5 inches and 12 inches. In some instances, the base plate (102) can be greater than 12 inches, such as, for example 16 inches to 24 inches. An aperture (104) extends along a line along parallel to the plane of the base plate (102), beginning near the mounting point of the base plate (102), continuing to the perimeter of the base plate (102). In some embodiments, the width of the aperture (104) is approximately the width of standard grade stake, such as, for example, approximately 1.75 inches. In other embodiments, the width of the aperture (104) is adjustable to accommodate stakes of different widths.

In some embodiments, the weight of the base plate (102) corresponds to a weight required to achieve a desired level of stability, such as would be desired in windy conditions. In some instances, the thickness of the base plate (102) is between 0.25 inches and 0.75 inches. In some instances, the base plate (102) is configured to receive additional weighted components to further enhance stability of the geodetic surveying system (100). In some embodiments, the base plate (102) includes one or more tethered, integral, or removable stakes that extend from the ground-facing surface of the base plate (102) or otherwise connect to the base plate (102) or an extension of the base plate (102) such that the one or more stakes can further enhance the stability of the geodetic surveying system (100). In some instances, an integral or removable spike (110) is centered on the ground-facing surface of the base plate (102). In some instance, the spike (110) is made of metal, such as steel or iron. The spike (110) can be any length able to easily penetrate the ground surface material, such as a spike between one inch and three inches. For softer ground surfaces the spike (110) can be longer, such as between three inches and 6 inches. In very soft surfaces, the spike can be between 6 inches and 12 inches.

In some embodiments, a display shield (224) is mounted to a pole position above the position of the GPS device (218). The display shield (224) can be transparent, translucent, or opaque. In some instances, the display shield (224) can be adjusted vertically along the pole (106), along an axis perpendicular to the pole (106), or both. The display shield (224) can be positioned in a way to reduce or block certain light, such as sunlight, such that the GPS display (220) is more easily observed, such as by reducing glare, improving the contrast of the display light to the surrounding lighting conditions, or both. The display shield (224) can also be positioned in a way that protects the GPS display (220) by reducing the amount of direct contact of the display (220) with weather elements, such as rain or dust. In some instances, the display shield (224) is made of a plexiglass material.

In some embodiments there is a single pole (106) with one end connectable to the base plate (102) and the other end connectable to the mountable satellite positioning system receiver (212). In other embodiments, there are two connectable poles (106, 210), with one pole (106-*a*) connectable to the base plate (102) and the other end connectable to the mountable geodetic surveying system receiver. In some instances, one or more of the poles (106) is telescopic. In some instances, one or more poles (106) includes marks along at least a portion of the length of the external surface of the pole indicative of certain distance measurements, such as inches or fractions of inches, such as 1/10 inches. In some instances, one or more poles (106) are made of a metal such as aluminum. The diameter of the pole (106) can vary, such as, for example, between 0.5 inches and 1.5 inches. In some embodiments, the diameter can be between 1.5 inches and 3 inches. In some instances, the end portion of the pole (106-*b*) connectable to the mountable satellite positioning system receiver (212) is threaded. In some instances, the end portion of the pole (106-*a*) connectable to the base plate (102) mounting point is threaded.

In some embodiments, a GPS device (218) with a display, such as a GPS tablet device, can be coupled to a portion of one or more of the poles (106), such as with a clamp (222).

In some instance, a level indicator is mounted to or embedded in a pole portion, such as, for example, at about one meter.

The steps involved in setting grade stakes using this base plate (102) supported geodetic survey system (100) typically include some or all of the following:

Determine the desired stake placement location;

Maneuver the base plate-supported geodetic survey system (100) to the desired stake placement location;

Drive the stake into the ground through the aperture (104) of the base plate (102) at a point close to the where the pole (106) is mounted to the base plate (102);

Level the base plate-supported geodetic survey system (100); Mark the grade stake at distance x up from the point where the ground meets the grade stake, indicating the desired level plus or minus x as appropriate; and Tie a ribbon to the grade stake.

Where a ground stake is already placed, the steps involved in setting grade stakes using this base plate (102) supported geodetic survey system (100) typically include some or all of the following:

Maneuver the existing ground stake into the aperture (104) of the base plate (102) until it is against the point closest to where the pole (106) is mounted to the base plate (102);

Level the base plate-supported geodetic survey system (100);

Mark the grade stake at distance x up from the point where the ground meets the grade stake, indicating the desired level plus or minus x as appropriate; and Tie a ribbon to the grade stake.

Clause 1. A geodetic surveying system, comprising: a pole-mountable base plate (102) comprising an aperture (104); a pole (106); a mountable satellite positioning system receiver (212); a computing device (218) in communication with the mountable satellite positioning system receiver (212); and a display shield (224).

Clause 2. The geodetic surveying system of claim 1, further comprising an antenna (214).

Clause 3. The geodetic surveying system of claim 1, further comprising a battery.

Clause 4. The geodetic surveying system of claim 1, wherein the pole (106) includes a surveying pole portion (106).

Clause 5. The geodetic surveying system of claim 4, wherein the surveying pole portion (106) includes measurement markings (108).

Clause 6. The geodetic surveying system of claim 4, wherein the aperture (104) extends from a surveying pole portion (106) mount point to a perimeter of the pole-mountable base plate (102).

Clause 7. The geodetic surveying system of claim 4, wherein the surveying pole portion (106) is coupled to the pole-mountable base plate (102).

Clause 8. The geodetic surveying system of claim 1, (218) wherein the mountable satellite positioning system receiver (212) includes a GPS receiver.

Clause 9. The geodetic surveying system of claim 1, further comprising a level indicator.

Clause 10. The geodetic surveying system of claim 9, wherein the level indicator includes a pole mounted level indicator.

Clause 11. The geodetic surveying system of claim 9, wherein the level indicator includes an embedded level indicator.

Clause 12. The geodetic surveying system of claim 1, wherein the computing device (218) includes a display (220).

Clause 13. The geodetic surveying system of claim 1, wherein the display shield (224) includes an adjustable display shield (224).

Clause 14. The geodetic surveying system of claim 1, wherein the display shield (224) includes a removable display shield (224).

Clause 15. The geodetic surveying system of claim 1, wherein the display shield (224) includes a pole mountable display shield (224).

Although the described embodiments of the present invention are believed to represent the best mode of the present invention, it should be understood that many described components of the present invention have known functional equivalents. Additionally, orientations, proportions and shapes used within the description may be modified by a person skilled in the art. All such modifications and deviations are intended to be covered by the scope of the invention.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," "approximately," "nearly," or the like, it will be understood that the particular value forms another aspect. It will be further understood that the endpoints of each of the ranges are significant both in relation to the other endpoint, and independently of the other endpoint.

Conditional language, such as "can," "could," "might," or "may," unless specifically stated otherwise, or otherwise understood within the context as used, is generally intended to convey that certain implementations include or do not include, certain features, elements, and/or steps. Thus, such conditional language is not generally intended to imply that features, elements, and/or steps are in any way required for one or more implementations.

Conjunctive language, such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Several illustrative implementations of the geodetic surveying system and method of operation have been disclosed. Although this disclosure has been described in terms of certain illustrative implementations and uses, other implementations and other uses, including implementations and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various implementations. All possible combinations and subcombinations of elements and components described herein are intended to be included in this disclosure. No single feature or group of features is necessary or indispensable.

Certain features that are described in this disclosure in the context of separate embodiments can also be implemented in combination in a single embodiment. Conversely, various features that are described in the context of a single implementation also can be implemented in multiple embodiments separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one implementation or example in this disclosure can be combined or used with (or instead of) any other portion of any of the steps, processes, structures, and/or devices disclosed or illustrated in a different implementation, flowchart, or example. The implementations and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any implementations having equivalent elements, modifications, omissions, and/or combinations are also within the scope of this disclosure. Moreover, although certain aspects, advantages, and novel features are described herein, not necessarily all such advantages may be achieved in accordance with any particular implementation. For example, some implementations within the scope of this disclosure achieve one advantage, or a group of advantages, as taught herein without necessarily achieving other advantages taught or suggested herein. Further, some implementations may achieve different advantages than those taught or suggested herein.

Additionally, any methods described herein may be practiced using any device suitable for performing the recited steps.

In summary, various implementations and examples of the geodetic surveying system and method of operation have been disclosed. This disclosure extends beyond the specifically disclosed implementations and examples to other alternative implementations and/or other uses of the implementations, as well as to certain modifications and equivalents thereof. Moreover, this disclosure expressly contemplates that various features and aspects of the disclosed implementations can be combined with, or substituted for, one another. Accordingly, the scope of this disclosure should not be limited by the disclosed implementations described above, but should be determined only by a fair reading of the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

The invention claimed is:

1. A geodetic surveying system, comprising:

a pole-mountable base plate comprising an aperture;

a pole;

a mountable satellite positioning system receiver;

a computing device comprising a display, the computing device in communication with the mountable satellite positioning system receiver; and a display shield.

2. The geodetic surveying system of claim 1, further comprising an antenna.

3. The geodetic surveying system of claim 1, further comprising a battery.

4. The geodetic surveying system of claim 1, wherein the pole comprises a surveying pole portion.

5. The geodetic surveying system of claim 4, wherein the surveying pole portion comprises measurement markings.

6. The geodetic surveying system of claim 4, wherein the aperture extends from a surveying pole portion mount point to a perimeter of the pole-mountable base plate.

7. The geodetic surveying system of claim 4, wherein the surveying pole portion is coupled to the pole-mountable base plate.

8. The geodetic surveying system of claim 1, wherein the mountable satellite positioning system receiver comprises a GPS receiver.

9. The geodetic surveying system of claim 1, further comprising a level indicator.

10. The geodetic surveying system of claim 9, wherein the level indicator comprises a pole mounted level indicator.

11. The geodetic surveying system of claim 9, wherein the level indicator comprises an embedded level indicator.

12. The geodetic surveying system of claim 1, wherein the display shield comprises an adjustable display shield.

13. The geodetic surveying system of claim 1, wherein the display shield comprises a removable display shield.

14. The geodetic surveying system of claim 1, wherein the display shield comprises a pole mountable display shield.

* * * * *